UNITED STATES PATENT OFFICE.

RALPH W. E. MacIVOR, OF LONDON, ENGLAND, ASSIGNOR TO METALS EXTRACTION CORPORATION LIMITED, OF LONDON, ENGLAND, A CORPORATION.

PROCESS OF TREATING NICKEL ORES, &c.

No. 846,492.      Specification of Letters Patent.      Patented March 12, 1907.

Application filed February 2, 1906. Serial No. 299,181.

*To all whom it may concern:*

Be it known that I, RALPH WALDO EMERSON MACIVOR, a subject of the King of Great Britain, residing at London, England, have invented certain new and useful Improvements in Processes for Treating Nickel Ores or Oxidized Nickel Mattes; and I do hereby declare the following to be a full, clear, and exact description of the invention, such as will enable others skilled in the art to which it appertains to make and use the same.

This invention relates to an improved process for treating nickel ores or oxidized mattes containing nickel, whereby a solution of chlorid of nickel is obtained, from which the nickel can be recovered by any of the known processes.

According to this invention ground ore containing nickel or mixed oxids of metal resulting from the roasting of mattes or regulus is digested under pressure in a solution of chlorid of magnesium, which gives a solution containing chlorid of nickel, from which the nickel can be recovered in any well-known manner.

Having thus described my invention, what I claim as new, and desire to secure by Letters Patent, is—

1. In the process of treating nickel ores or oxidized nickel mattes, mixing the ground ore or nickel oxids with chlorid of magnesium, and subsequently heating the mixture, substantially as described.

2. The process of treating nickel ores or oxidized nickel mattes for the recovery of nickel, consisting of mixing the ground ore or oxid of nickel with chlorid of magnesium, heating the mixture and then lixiviating the same to yield a solution of chlorid of nickel, substantially as described.

In witness whereof I have hereunto set my hand in the presence of two witnesses.

RALPH W. E. MacIVOR.

Witnesses:
     FREDERIC PRINCE,
     H. D. JAMESON.